(No Model.)
F. ENOS, Jr.
LAWN MOWER.
No. 401,696. Patented Apr. 16, 1889.
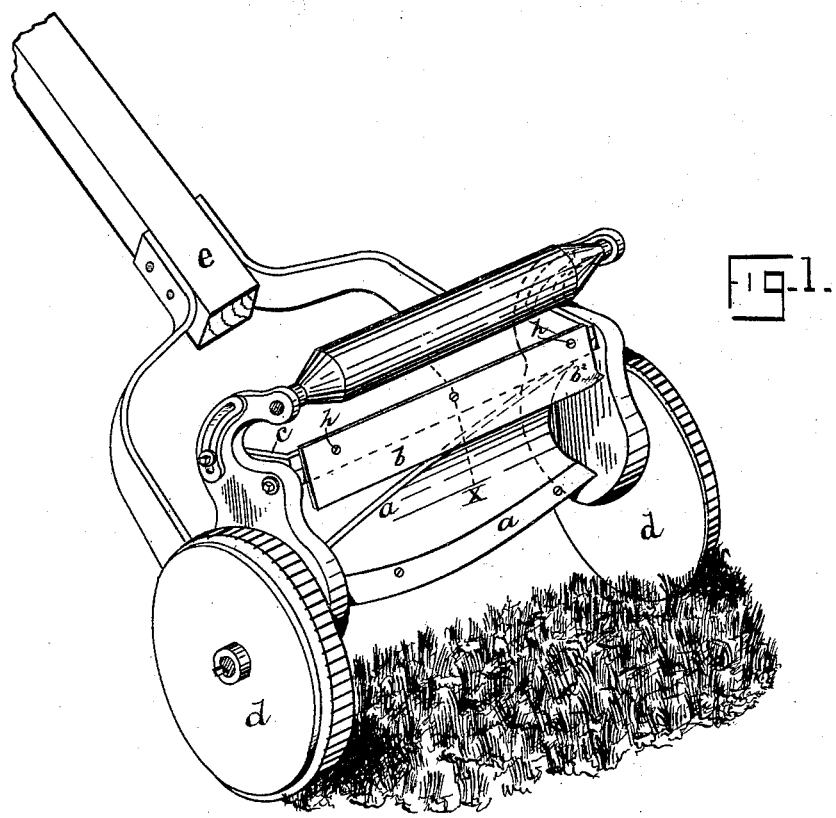
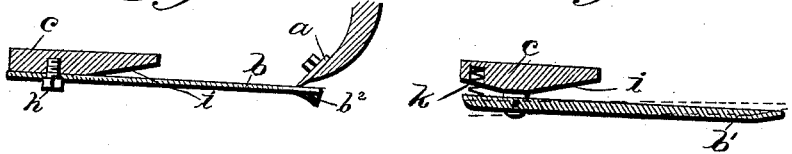
Witnesses,
Allen Tenny.
Henry H. Burnham.
Inventor,
Frank Enos Jr.,
By his Attorney
Frank H. Allen

UNITED STATES PATENT OFFICE.

FRANK ENOS, JR., OF NORWICH, CONNECTICUT.

LAWN-MOWER.

SPECIFICATION forming part of Letters Patent No. 401,696, dated April 16, 1889.

Application filed September 24, 1888. Serial No. 286,294. (No model.)

*To all whom it may concern:*

Be it known that I, FRANK ENOS, Jr., a citizen of the United States, and a resident of Norwich, in the county of New London and State of Connecticut, have invented certain new and useful Improvements in Lawn-Mowers, which improvements are fully set forth and described in the following specification, reference being had to the accompanying sheet of drawings, in which—

Figure 1 is a perspective view of a mower embodying my improvements, said mower being shown in an inverted position to more clearly expose the knives. Fig. 2 is an enlarged cross-section of the fixed knife and knife-bar and a portion of the rotary cutter on line X of Fig. 1, and Fig. 3 is a similar view illustrating a modification of said invention.

My said improvements are in the class of mowers in which a fixed knife coacts with a multiple of spirally-formed knives arranged to rotate around or with a central shaft, and my immediate object is to provide a form of fixed knife that may be used until worn out without requiring sharpening or truing up. So far as I am familiar with this class of machines it has been necessary heretofore to frequently remove either the rotary or fixed knives, or both, and true up and sharpen the same, and to readjust them relative to each other, it being absolutely necessary that said knives should be in such perfect condition that a continuous shearing cut be attained in order to produce satisfactory results.

The improvement that forms the essential feature of this invention consists of a knife, (corresponding to the fixed knife above referred to,) which is so formed and supported that it is capable of readily adjusting itself to the rotating knives. This result having been attained, the knives may continue to cut smoothly for an indefinite length of time without resharpening.

Referring to the drawings, the letters $a$ indicate the knives or blades of the rotating cutter, and $b$ the adjacent fixed knife, the latter being secured to a knife-bar, $c$, supported at each end between the sides of the main frame of the mower.

$d$ $d$ are the usual traction-wheels, and $e$ the draft-handle.

The means employed to rotate the knives $a$ forms no part of my present invention, and I have therefore thought it unnecessary to illustrate or describe said means in detail.

The simplest form of my improved fixed knife consists of a blade of sheet-steel, $b$, that is attached to the knife-bar $c$ by screws $h$, (see particularly Fig. 2,) said blade being of such thickness that the edge engaging the rotary knives may spring freely and follow readily any irregularities of said rotary knives. That end of blade $b$ that first engages the passing knives $a$ is preferably bent downward, as shown at $b^2$ in Fig. 1, to prevent the catching of said end against said knives. The knife-bar $c$ is beveled or inclined, as at $i$, above the blade $b$ to allow said blade a free and unobstructed movement. This blade $b$ is so clamped to the knife-bar that its edge bears quite heavily against the rotating knives, and is in practice forced slightly downward by said knives as they engage it, the movement of the free edge of blade $b$ being theoretically a wave motion as said rotary knives brush past it.

When an irregular or dull place in the rotating knives passes into contact with the sheet-metal blade $b$, said blade, by its spring action, at once adjusts itself to such irregularities and performs as perfect work as at those points that remain sharp and regular.

In the modification illustrated in Fig. 3 the same desirable result is attained with a non-elastic knife, $b'$, that is hinged to the knife-bar $c$. The cutting-edge of said knife is forced upward into engagement with the rotating knives by springs $k$, seated in the knife-bar and pressing constantly in the rear of the hinge-pintle. Said springs act automatically and forcibly to hold the cutting-edge of said knife $b'$ in close engagement with the rotating knives and cause said edge to adjust itself to irregular places, as above described in connection with a knife formed from the spring-plate $b$. With the knife formed from a fixed plate of the yielding form, substantially as described, no sharpening or repairing of the knives or blades is necessary unless they are actually broken or notched by contact with stones or other hard substances.

Having described my invention, I claim—

1. In combination with a rotary cutter having spiral knives, a yielding shearing-blade parallel or approximately parallel with the axis of said rotary cutter and pressing against its knives, substantially as set forth, and for the purpose specified.

2. In combination with a rotary cutter having spiral knives, a shearing-blade substantially parallel with the axis of said cutter and pressing against its knives, said blade being formed of sheet metal, arranged as described, so that the cutting-edge may yield to follow the cutting-edge of said rotary cutter, substantially as and for the object specified.

FRANK ENOS, JR.

Witnesses:
FRANK H. ALLEN,
ALLEN TENNY.